INVENTOR
Roger Wakefield Fenton
BY
Baldwin Wight Diller & Brown
ATTORNEYS

INVENTOR
Roger Wakefield Fenton
BY
Baldwin Wight Diller & Brown
ATTORNEYS

Sept. 22, 1970 R. W. FENTON 3,530,234

SIGNAL MIXING ARRANGEMENTS USING PROPORTIONAL CLOSING OF SAMPLING SWITCHES

Filed Jan. 15, 1968 3 Sheets-Sheet 3

INVENTOR
Roger Wakefield Fenton
BY
Baldwin Wight Diller & Brown
ATTORNEYS

United States Patent Office 3,530,234
Patented Sept. 22, 1970

3,530,234

SIGNAL MIXING ARRANGEMENTS USING PROPORTIONAL CLOSING OF SAMPLING SWITCHES

Roger Wakefield Fenton, Writtle, England, assignor to The Marconi Company Limited, London, England, a British company Filed Jan. 15, 1968, Ser. No. 697,682
Claims priority, application Great Britain, Mar. 9, 1967, 11,108/67
Int. Cl. H03k *17/02, 17/68;* H04n *7/00, 5/22*
U.S. Cl. 178—6 10 Claims

ABSTRACT OF THE DISCLOSURE

In known signal mixing arrangements signals from two sources are fed to two variable gain amplifiers, which are paired with joint opposed control to give a constant composite output level. If signals from four sources are to be mixed composite signals from two pairs are mixed, involving three amplifier pairs, and it is difficult to maintain good stability. Also this is expensive.

In the invention each signal source is connected through a sampling switch to a common output. The sampling switches are controlled by a high frequency signal, and are arranged so that only one switch may be closed at a time.

This invention relates to signal mixing arrangements and though not limited exclusively to its application thereto is primarily intended for use in arrangements for mixing video signals which are derived from a number of television cameras or other video signal sources and are required to be fed, at required times and in required proportions, to a common signal receiving circuit from which the mixed signals can be taken for subsequent processing and transmission. The invention is, however, applicable to all cases in which mixing of analogue signals within a wide frequency band is required.

It is common, in television studio and similar practice, to provide a number—often a considerable number—of television cameras or other sources of video signals having the same television standards. Some of these sources may provide, for example, signals corresponding to the same scene viewed from different positions and some may provide signals corresponding to different scenes. Among the many operations which may be required to be performed with signals from such different sources are those known as "cutting", "video mixing" and "wiping." "Cutting" is the operation of replacing the signals fed to the common circuit from one source by those from another. "Video mixing" is the operation of feeding signals from two or more of the sources simultaneously and in predetermined (and usually adjustable) proportions to the common circuit. "Wiping" is the operation of time-sharing the feeding of signals from two (or more) of the sources to the common receiving circuit e.g. in the case of time-sharing between two sources, it may be required to feed the signals from the two sources alternately to the common receiving circuit at a desired frequency so that, for a desired proportion of a certain time (normally a scanning line period or a television field period) one source is connected to the common circuit and for another portion of said time the other source is so connected. It is usually required to vary, in some predetermined manner, the "mark/space" ratio of the switches (normally electronic) is circuits connecting the individual sources to the common receiving circuit and, in the usual "wiping" arrangement a controlled switching action is obtained by means of a wave form or pattern generator in synchronism with the television scanning waveforms e.g. for the purpose of replacing part of one picture by the corresponding part of another—say to produce a composite picture with the left hand half from one camera and the right hand half from another.

Figure 1:
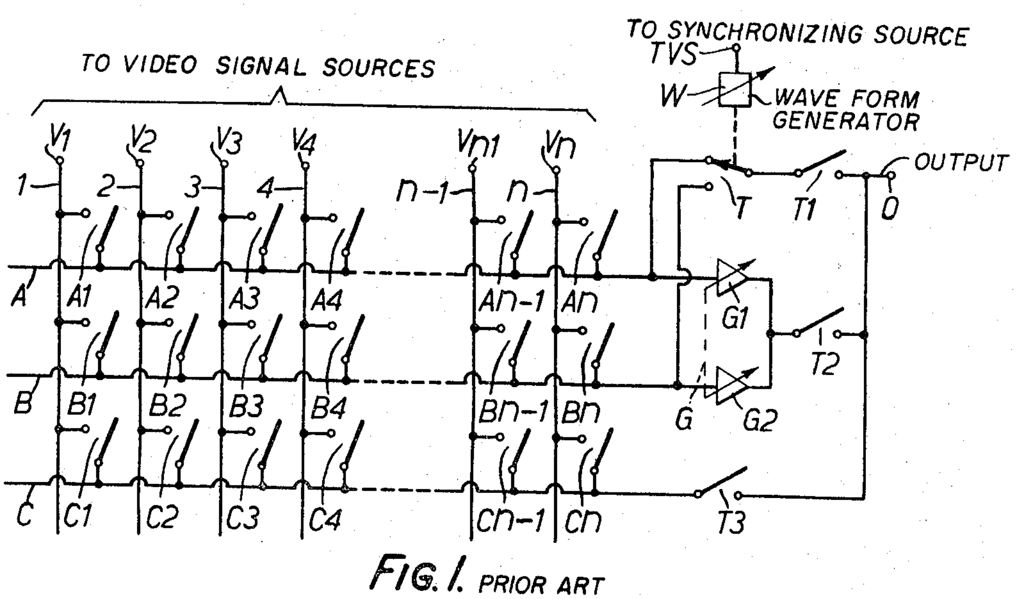
FIG. 1. PRIOR ART

FIG. 1 of the accompanying drawings shows in simplified diagrammatic manner a typical known video signal arrangement capable of performing "cutting," "video mixing" and "wiping."

Referring to this FIG. 1, which is provided for purposes of preliminary explanation, video signals from a number *n* of video signal sources (not shown) such as television cameras are applied at the terminals $V_1$, $V_2$, $V_3$, $V_4$ . . . $V_{n-1}$, $V_n$ of a corresponding number of parallel bus bars 1, 2, 3, 4, *n*—1, and *n*. These bus bars are crossed by three parallel bus bars A, B and C at right angles to the first mentioned bars. At each crossing point is provided a switch which, when closed, connects the two bars which cross at that point. These switches are referenced $A_1$ to $A_n$, $B_1$ to $B_n$ and $C_1$ to $C_n$. The operation of these switches is electrically or otherwise interlocked so that, at any time, only one switch in each group $A_1$ to $A_n$, $B_1$ to $B_n$ and $C_1$ to $C_n$ can be closed. The bars A and B are connected to the respective inputs of two variable gain amplifiers $G_1$ and $G_2$ which are oppositely and jointly controllable in gain by a single control conventionally indicated at G and the outputs of which are taken through a switch T2 to the output terminal O. The bars A and B are connected to the fixed contacts of a two way electronic switch T the "armature" of which is connected through a further switch $T_1$ to the output terminal O. The switch T is operated by a wave form or pattern generator W controlled by a television synchronising signal input applied at the terminal TVS so that the switch T changes over at scanning line frequency. This is, of course, not essential, for obviously the frequency of change-over of the switch T would be chosen in accordance with operating requirements. Thus it could be arranged to change over at the television field frequency or it could be arranged to change over at some frequency which is a function of both the television line and field frequencies. The last mentioned choice would be made where, for example, it was required to insert one picture into a corner of another to replace a corner part of that other. The generator W is adjustable as to its "mark/space" ratio so that the relation of the times in which the switch T makes connection to its two contacts can be adjusted. The bus bar C is connected through a further switch $T_3$ to the output terminal C. The switches $T_1$, $T_2$ and $T_3$ are interlocked so that only one of them can be closed at a time.

With this known arrangement, which is typical of present day practice, any of the three operations "wiping," "video mixing" or "cutting" can be obtained by closing one of the three switches $T_1$, $T_2$ or $T_3$ respectively. When the switch $T_1$ is closed the operation of the electronic switch T causes the signals supplied to the output terminal O to be supplied, alternately, from bar A and from bar B, and as will be apparent, any of the sources $V_1$ to $V_n$ may supply signals to these bars in dependence upon which of the switches $A_1$ to $A_n$ and $B_1$ to $B_n$ are selected for closure. Adjustment of the mark/space ratio of the pattern generator W determines how much of the picture is built up from the signals in bar A and how much is built up from the signals on bar B and this adjustment can be varied as desired between the limit at which the entire picture is obtained from the signals on bar A and that at which the entire picture is obtained from the signals on bar B.

When switch T2 is closed "video mixing" can be obtained by means of the two variable gain amplifiers G1 and G2 the gang control of which is such as to provide a constant composite output signal strength over the whole range of control i.e. the two amplifiers are oppositely gain controlled so that, on one extreme limit of the gang control, G1 is at maximum gain and $G_2$ provides zero output while in the other extreme limit $G_2$ is at maximum gain and $G_1$ has zero output.

When switch $T_3$ is closed, "cut" transitions can be obtained by closing any one of the switches $C_1$ to $C_n$ and simultaneously opening whichever of these switches was previously closed.

FIG. 1 shows a relatively simple example of known practice in television signal mixing and controlling practice and considerably more complex arrangements of the same type are often used. Thus, in many cases provision is required to be made for building up a composite picture from the signals from more than two sources and, in one known arrangement capable of achieving this, provision is made for "video mixing," by the method used in FIG. 1, the signals from two sources to provide a composite signal; "video mixing," by the same method, the signals from two other sources to provide a second composite signal; and, again using the same method, "video mixing" the two composite signals to produce an output signal which is in fact composed from the signals from four original video sources. Such an arrangement involves, for these "video mixing" operations, the provision of six variable gain amplifiers in three jointly controlled pairs. Variable gain amplifiers, especially variable gain amplifiers required to be paired with joint opposed control to give a constant composite output level, are expensive and difficult to design to prevent well-maintained good stability and design performance, and it will readily be appreciated that arrangements of the nature of that of FIG. 1 are always expensive and may, if extended (for example as above described) become very expensive indeed. The present invention seeks to overcome this defect and to provide improved and simple arrangements for mixing wide band analogue signals—notably for "video mixing" video signals from video signal sources—in which the mixing is performed by switching means without the use of variable gain amplifiers.

According to this invention a signal mixer arrangement for supplying, in desired controllable proportions, input signals from a plurality of sources to a common output circuit comprises a plurality of signal sampling switches, one in each of the paths between said sources and said common output circuit; switch operating means for sequentially operating said sampling switches at a frequency which is much higher than the highest input signal frequency and in such manner that, at any one time, one only of said sampling switches is closed at said time; means for controlling the proportions of the total time during which the different switches are closed; and means for excluding the switching frequency from the common output circuit.

In its simplest form a mixer arrangement in accordance with this invention comprises two signal sampling switches, each in circuit between one or other of two wide-band input signal supply points and a common output circuit; a switch operating means operable at a switching frequency which is much higher than the highest input signal frequency and is arranged to close said switches alternately so that when one is closed the other is open and vice versa; means for controlling the mark/space ratio of said switch operating means; and means for excluding the switching frequency from the common output circuit.

Preferably the means for excluding the switching frequency from the common output circuit is constituted by a low pass filter inserted in the signal channel between the sampling switches and the common output circuit and having the upper frequency limit of its low pass band at a frequency between the highest input signal frequency and the switching frequency.

Preferably the switching frequency is at least twice the highest input frequency.

Preferably the switch operating means is constituted by a device having a number of stable states in each of which it closes a different sampling switch.

A preferred form of video signal mixer in accordance with this invention comprises a mixer arrangement as herein set forth, a pattern generator synchronised by signals derived from synchronising signals in the video signals to be mixed, and means operable at will for switching in said pattern generator for use, in substitution for the aforesaid switch operating means for operating the signal sampling switches.

A preferred form of video signal mixing and controlling arrangement in accordance with this invention comprises a mixer arrangement as herein set forth, a pattern generator synchronised by signals derived from synchronising signals in the video signals to be mixed; means operable at will for switching in said pattern generator for use, in substitution for the aforesaid switch operating means for operating the signal sampling switches; and means, operable at will, for connecting, in place of the pattern generator and the aforesaid switch operating means, means for selecting and maintaining closed any one of the signal sampling switches.

Figure 2:
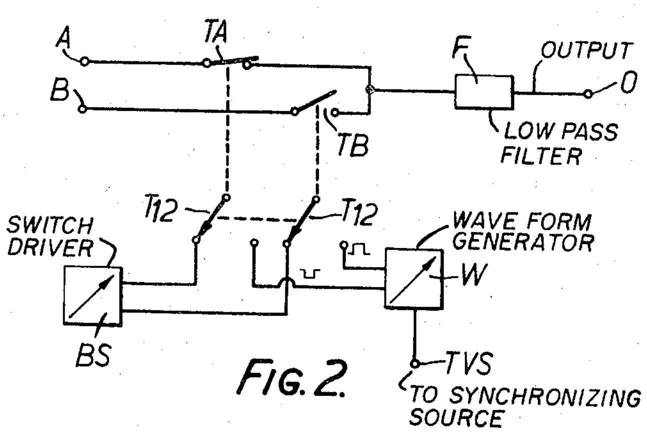

FIG. 2 of the accompanying drawings shows, in simplified block diagram form, an arrangement which includes a "video mixer" in accordance with this invention and which could be used, with great advantage, in substitution for the known means provided in FIG. 1 for making provision for "video mixing" and "wiping."

Referring to FIG. 2 the terminals A and B represent the right hand ends, in FIG. 1, of the bus bars A and B of that figure. The double pole switch $T_{12}$ replaces the switches $T_1$ and $T_2$ of FIG. 1 and serves to effect choice between "wiping" and "video mixing." With the switch $T_{12}$ in the position shown, "video mixing" is selected; in its other position it selects "wiping." The bus bars A and B are connected to the input end of a low pass filter F through electronic switches $T_A$ and $T_B$ and the output of the filter is taken off from an output terminal O for utilization. The switches are sampling switches and are operated by a free-running multi-vibrator or other suitable switch driver BS in such manner that when $T_A$ is closed $T_B$ is open and vice versa. The mark/space ratio of the free-running multivibrator BS is adjustable and since, when on "mark" it closes one of the sampling switches and when on "space" it closes the other it can be seen that, by adjusting the mark/space ratio, the relation of the fraction of the time during which either sampling switch is closed can be adjusted between the limits of permanently closed and permanently open. The frequency at which complete samples occur—the period of a complete sampling cycle is the time between a closure of one sampling switch and its next re-closure after the other sampling switch has been closed—is determined by the frequency of operation of the bistable and is chosen at a value at least twice the highest frequency in the signals on the bus bars A and B. The low pass filter F has its upper cut off frequency chosen between the aforesaid highest frequency and the said sampling cycle frequency, its purpose being to pass only the frequencies in the analogue signals from the bus bars and to reject the sampling frequency, its sidebands and harmonics thereof. When the switch $T_{12}$ is moved into its other or "wipe" position, the sampling switches are operated by a pattern generator W which is adjustable, is controlled by television synchronising signals fed in at terminal TVS and corresponds generally to the pattern generator W of FIG. 1.

Figure 3:
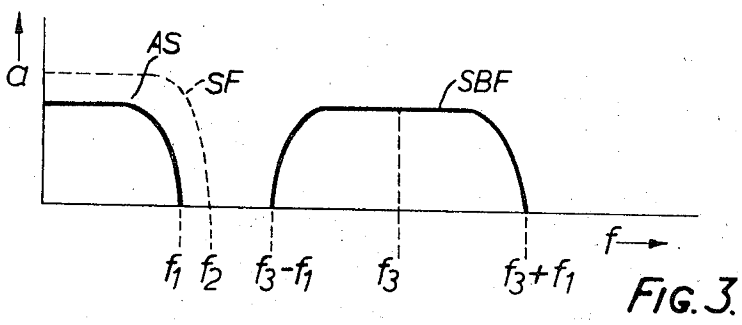

The frequency relations in FIG. 2 are shown conventionally in FIG. 3 in which amplitude $a$ is shown against a linear scale of frequency $f$. In FIG. 3, AS represents the band occupied by the analogue signals $f_1$ being the highest frequency thereof; the dotted curve SF is a suitable response curve for the filter F (cut-off frequency $f_2$) and the curve SBF represents the sampling cycle frequency $f_3$ and its side bands.

Figure 4:
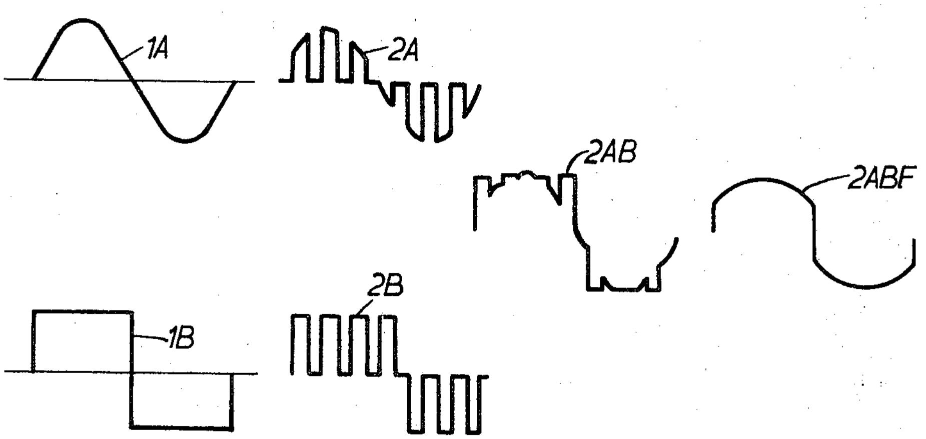

FIG. 4 shows the nature of the result achieved in the "video mixing" operation performed. It is drawn, for the sake of simplicity, on the assumption that two signals to be mixed, one on bar A and the other on bar B are sinusoidal and of square wave form, respectively. 1A and 1B show these inputs. The results of sampling by the switches $T_A$ and $T_B$ are shown at 2A and 2B respectively, it being assumed, for the purpose of drawing the forms 2A and 2B that the mark/space ratio of the free-running multivibrator BS is so adjusted that the switches $T_A$ and $T_B$ close (in alternation, of course) for equal periods of time. Accordingly equal proportions of the two signals will appear at the input of the filter F and the resultant input wave form at this filter will be, as shown at 2AB of FIG. 4, the sum of the waves 2A and 2B. This wave form 2AB, after passing through the filter F, becomes as shown at 2ABF in FIG. 4.

Figure 5:
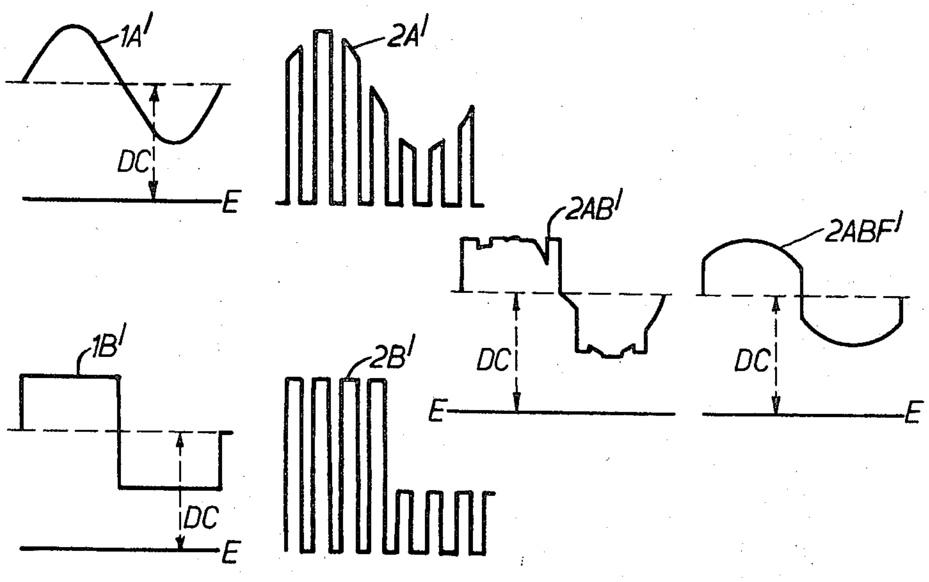

FIG. 4 is drawn for the case in which the signals 1A and 1B are signals having no D.C. component. In such a case the electronic sampling switches $T_A$ and $T_B$ must be bilateral in action since they must take samples during both positive and negative excursions of the wave form 1A and 1B. However simplified sampling switches of the unilateral type may be used if a D.C. component is added to the wave forms 1A and 1B so that they become unipolar. The results then achieved are illustrated by FIG. 5 in which earth potential is indicated at E and the D.C. component added is indicated at D.C. FIG. 5 is practically self-explanatory in view of what has already been said about FIG. 4. In FIG. 5 the wave forms 1A′, 1B′, 2A′, 2B′, 2AB′ and 2ABF′ correspond respectively to the wave forms 1A, 1B, 2A, 2B, 2AB and 2ABF of FIG. 4. It will be observed from FIGS. 4 and 5 that the wave form 2AB′ and 2ABF′ are, respectively, unaltered with respect to the wave form 2AB and 2ABF and that the D.C. component is passed on to the output circuit at O.

The contribution of each input signal from A or B is dependent on the relative amounts of time for which samples of each input are taken and the dependence is linear. Therefore, since the sum of the times during which samples are taken from the two inputs is constant i.e. the sampling is complementary—the ratio of the mixture of the input signals contributing to the output is controllable by controlling the mark/space ratio of the free-running multi-vibrator BS.

Signals from more than two sources can be mixed by providing the same number of sampling switches as there are sources, one in circuit with each source, feeding the sampled outputs to a common output terminal via a filter, and closing the sampling switches in succession, one at a time. Obviously, in such a case, the driving means for the sampling switches must have the same number of stable states as there are sampling switches and, for control purposes, must be such as to permit the time sharing to be adjusted, i.e. to permit the relative periods of closures of the individual switches to be adjusted.

Figure 6:
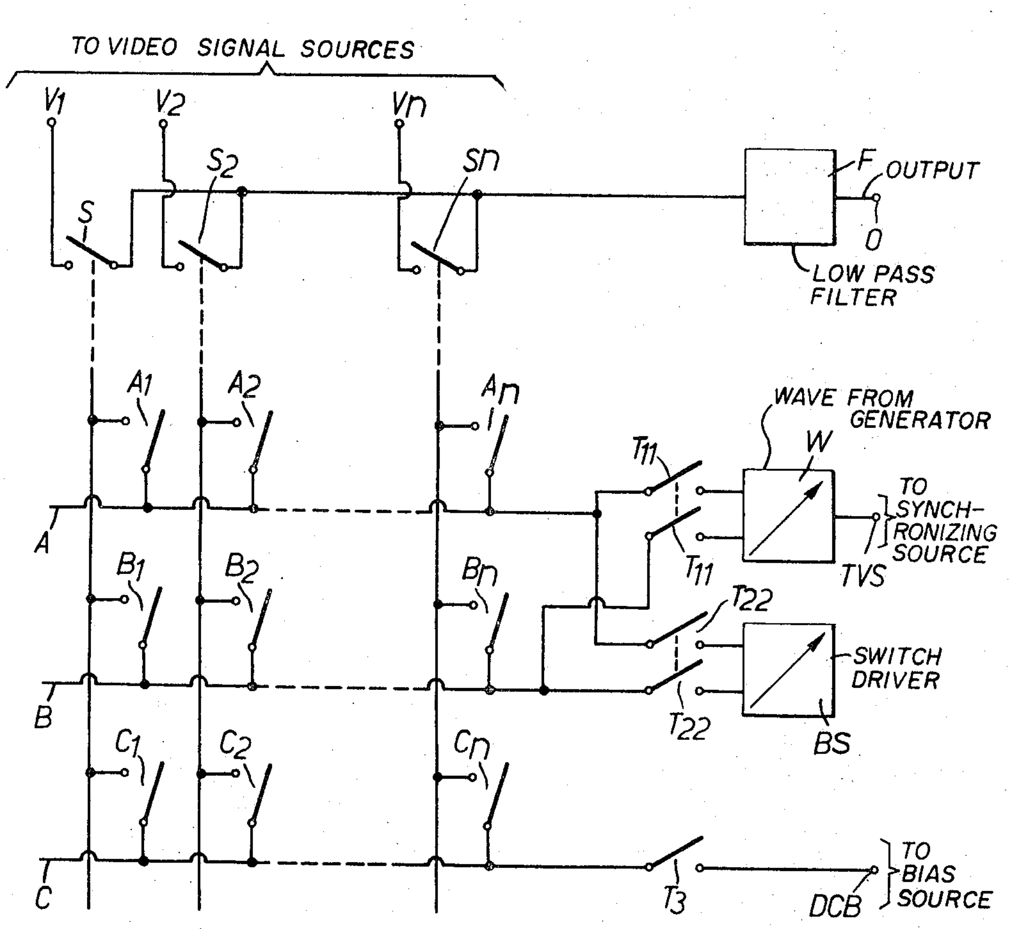

FIG. 6 shows an improved arrangement utilising the present invention and capable of performing the operations of "wiping," "video mixing" and "cutting" as performed by the known arrangement of FIG. 1. It will be observed that there are no variable gain amplifiers and that the simplified circuitry involved in carrying out the invention has been taken advantage of to simplify the whole arrangement still further. Bus bars A, B and C and electronic switches $A_1$ to $A_n$, $B_1$ to $B_n$ and $C_1$ to $C_n$ correspond with those in FIG. 1 except that these carry driving signals for the sampling switches $S_1$ to $S_n$. The video input signal terminals are again referenced $V_1$ to $V_n$ and O is the output terminal.

In order to effect "wiping" the double pole switch $T_{11}$ is closed; "video mixing" can be accomplished if the double pole switch $T_{22}$ is closed; and, to effect "cutting" switch $T_3$ is closed. W is a pattern generator corresponding to the generator W of FIG. 2 and is synchronised by television synchronising signals fed in at TVS. BS is a free-running multi-vibrator corresponding to the free-running multi-vibrator BS of FIG. 2.

As will be seen, when switch $T_{11}$ is closed output from the pattern generator is applied to the bus bars A and B and if, instead, switch $T_{22}$ is closed, output from the free-running multi-vibrator is applied to these bus bars. Sampling is effected by sampling switches $S_1$ to $S_n$ each of which samples signals fed in to one of the terminals $V_1$ to $V_n$ respectively. These sampling switches, which effect the time sharing of the signals from two of the video signal sources as do the sampling switches $T_A$ and $T_B$ of FIG. 2, are actuated as before at a frequency at least twice that of the highest video frequency present in the input signals and actuation is effected, as conventionally indicated by broken lines leading to said switches, by switch actuating pulses fed in via bars A and B from pattern generator W or from free-running multi-vibrator BS depending upon whether switch $T_{11}$ or switch $T_{22}$ is closed. The control of the switches $A_1$ to $A_n$ and $B_1$ to $B_n$ is such that only one in each of these two groups can be closed at any time, the two selected for closure (one in each group) being such that the switch operating pulses are applied to operate the two sampling switches associated with the two video inputs from which signals are to be taken. Thus, for example, if $A_1$ is closed and any one of the switches $B_2$ to $B_n$ is also closed e.g. $B_4$ sampling switches $S_1$ and $S_4$ will sample and mix signals fed in at $V_1$ and $V_4$. Filter F corresponds to filter F of FIG. 2. To effect a "cutting" operation $T_3$ is closed and a suitable D.C. bias potential, applied at terminal DCB will be applied through whichever of the switches $C_1$ to $C_n$ is closed to cause the appropriate one of the switches $S_1$ to $S_n$ to close and thus pass the signals from the corresponding one of the inputs $V_1$ to $V_n$ to the output.

I claim:

1. A signal mixer arrangement for supplying, in desired controllable proportions, input signals from a plurality of sources to a common output circuit said arrangement comprising a plurality of signal sampling switches, one in each of the paths between said sources and said common output circuit; switch operating means for sequentially operating said sampling switches at a frequency which is much higher than the highest input signal frequency and in such manner that, at any one time, one only of said sampling switches is closed at said time; means for controlling the proportions of the total time during which the different switches are closed; and means for excluding the switching frequency from the common output circuit.

2. A signal mixer arrangement as claimed in claim 1 wherein said plurality of signal sampling switches consist of two signal sampling switches, each in circuit between one or other of two wide-band input signal supply points constituting said plurality of sources, and said common output circuit; said switch operating means being arranged to close said two signal sampling switches alternately so that when one is closed the other is open and vice versa; and including means for controlling the mark/space ratio of said switch operating means.

3. A signal mixer arrangement as claimed in claim 1 wherein the means for excluding the switching frequency from the common output circuit is constituted by a low pass filter inserted in the signal channel between the sampling switches and the common output circuit and having the upper frequency limit of its low pass band at a frequency between the highest input signal frequency and the switching frequency.

4. A signal mixer arrangement as claimed in claim 3 wherein the switching frequency is at least twice the highest input frequency.

5. A signal mixer arrangement as claimed in claim 4 wherein the switch operating means is constituted by a device having a number of stable states in each of which it closes a different sampling switch.

6. A video signal mixer comprising a mixer arrangement as claimed in claim 5 a pattern generator synchronised by signals derived from synchronising signals in the video signals to be mixed, and means operable at will for switching in said pattern generator for use, in substitution for the aforesaid switch operating means for operating the signal sampling switches.

7. A video signal mixing and controlling arrangement comprising a mixer arrangement as claimed in claim 5, a pattern generator synchronised by signals derived from synchronising signals in the video signals to be mixed; means operable at will for switching in said pattern generator for use, in substitution for the aforesaid switch operating means for operating the signal sampling switches; and means, operable at will, for connecting, in place of the pattern generator and the aforesaid switch operating means, means for selecting and maintaining closed any one of the signal sampling switches.

8. A signal mixer arrangement as claimed in claim 2 wherein the means for excluding the switching frequency from the common output circuit is constituted by a low pass filter inserted in the signal channel between the two signal sampling switches and the common output circuit and having the upper frequency limit of its low pass band at a frequency between the highest input signal frequency and the switching frequency.

9. A signal mixer arrangement as claimed in claim 8 wherein the switching frequency is at least twice the highest input frequency.

10. A signal mixer arrangement as claimed in claim 9 wherein the switch operating means is constituted by a device having a two stable states in each of which it closes a different one of said two signal sampling switches.

References Cited

UNITED STATES PATENTS 3,371,160 2/1968 Hurford.

RICHARD MURRAY, Primary Examiner

H. W. BRITTON, Assistant Examiner

U.S. Cl. X.R.

178—5.6; 328—104